United States Patent
Lee et al.

(10) Patent No.: US 12,519,891 B2
(45) Date of Patent: Jan. 6, 2026

(54) DEVICE AND METHOD FOR RECOVERING LOST INFORMATION IN WIRELESS COMMUNICATION SYSTEM

(71) Applicant: Samsung Electronics Co., Ltd., Suwon-si (KR)

(72) Inventors: Taehoon Lee, Suwon-si (KR); Junbeom Lee, Suwon-si (KR); Hyeongyo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 18/349,534

(22) Filed: Jul. 10, 2023

(65) Prior Publication Data

US 2023/0353685 A1  Nov. 2, 2023

Related U.S. Application Data

(63) Continuation of application No. PCT/KR2022/001993, filed on Feb. 9, 2022.

(30) Foreign Application Priority Data

Feb. 9, 2021  (KR) .................... 10-2021-0018649

(51) Int. Cl.
   *H04M 15/00* (2024.01)
   *H04M 17/00* (2024.01)
   *H04W 4/24* (2024.01)

(52) U.S. Cl.
   CPC ......... *H04M 15/857* (2013.01); *H04M 15/64* (2013.01); *H04M 15/854* (2013.01)

(58) Field of Classification Search
   CPC ..... H04L 67/14; H04L 12/14; H04L 12/1407; H04L 67/141; H04L 69/40; H04M 15/857;
   (Continued)

(56) References Cited

U.S. PATENT DOCUMENTS 9,374,802 B2  6/2016  Siomina et al.
9,596,707 B2  3/2017  Zhu et al.
(Continued)

FOREIGN PATENT DOCUMENTS

CN   105102084 A    11/2015
EP   3 755 014 A1   12/2020
(Continued)

OTHER PUBLICATIONS

IP.com search history (Year: 2025).*
(Continued)

*Primary Examiner* — Moustapha Diaby
(74) *Attorney, Agent, or Firm* — Jefferson IP Law, LLP

(57) ABSTRACT

An operation method of a session management function (SMF) is provided. The method includes the steps of transmitting a request message to a user plane function (UPF) on the basis of the UPF and a session configuration, receiving a response message from the UPF, determining whether there is a lost usage amount on the basis of the response message, and, when there is a lost usage amount, transmitting recovered usage amount information to an online charging system (OCS), wherein the response message may include current usage amount information and cumulative usage amount information of the UPF.

14 Claims, 10 Drawing Sheets

(58) Field of Classification Search
CPC ...... H04M 15/44; H04M 15/62; H04M 15/64; H04M 15/66; H04M 15/73; H04M 15/74; H04M 15/8221; H04M 15/8228; H04M 15/854; H04W 28/04; H04W 4/24; H04W 80/10; H04W 88/18
USPC .......................................................... 455/406
See application file for complete search history.

(56) References Cited

U.S. PATENT DOCUMENTS

| | | |
|---|---|---|
| 9,713,129 B2 | 7/2017 | Cordeiro et al. |
| 10,687,300 B2 | 6/2020 | Youn et al. |
| 10,736,072 B2 | 8/2020 | Youn et al. |
| 10,772,005 B2 | 9/2020 | Yan et al. |
| 11,330,475 B2 | 5/2022 | Oh |
| 2010/0107180 A1 | 4/2010 | Ulrich |
| 2018/0279411 A1 | 9/2018 | Kang et al. |
| 2018/0376445 A1 | 12/2018 | Yoon et al. |
| 2018/0376446 A1 | 12/2018 | Youn et al. |
| 2020/0022020 A1 | 1/2020 | Yan et al. |
| 2020/0045514 A1* | 2/2020 | Chai ............... H04M 15/64 |
| 2020/0100303 A1 | 3/2020 | Sankar et al. |
| 2020/0107213 A1 | 4/2020 | Park et al. |
| 2020/0112921 A1* | 4/2020 | Han ............... H04W 60/02 |
| 2020/0113008 A1 | 4/2020 | Luo et al. |
| 2020/0169639 A1* | 5/2020 | Chai ............... H04M 15/77 |
| 2020/0267085 A1 | 8/2020 | Nie et al. |
| 2020/0404739 A1 | 12/2020 | Thiebaut et al. |

FOREIGN PATENT DOCUMENTS

| | | |
|---|---|---|
| KR | 10-2011-0005424 A | 1/2011 |
| KR | 10-2018-0109714 A | 10/2018 |
| KR | 2019-0004221 A | 1/2019 |
| KR | 10-2019-0019005 A | 2/2019 |
| KR | 10-2019-0021461 A | 3/2019 |
| KR | 10-2019-0021462 A | 3/2019 |
| KR | 10-2078718 A | 2/2020 |
| KR | 10-2020-0082409 A | 7/2020 |
| WO | 2020/064106 A1 | 4/2020 |

OTHER PUBLICATIONS

3GPP TS 29.244 V16.6.0, 3rd Generation Partnership Project; Technical Specification Group Core Network and Terminals; Interface between the Control Plane and the User Plane Nodes; Stage 3, (Release 16), Dec. 11, 2020.

Huawei, Add Charging Principle for Usage Reporting, S5-206104, 3GPP TSG-SA5 Meeting #134e, electronic meeting, online, Nov. 6, 2020.

International Search Report dated May 26, 2022, issued in International Patent Application No. PCT/KR2022/001993.

Korean Office Action dated Oct. 30, 2025, issued in Korean Application No. 10-2021-0018649.

* cited by examiner

DEVICE AND METHOD FOR RECOVERING LOST INFORMATION IN WIRELESS COMMUNICATION SYSTEM

CROSS-REFERENCE TO RELATED APPLICATION(S)

This application is a continuation application, claiming priority under § 365(c), of an International application No. PCT/KR2022/001993, filed on Feb. 9, 2022, which is based on and claims the benefit of a Korean patent application number 10-2021-0018649, filed on Feb. 9, 2021, in the Korean Intellectual Property Office, the disclosure of which is incorporated by reference herein in its entirety.

BACKGROUND

1. Field

The disclosure relates to a wireless communication system. More particularly, the disclosure relates to an electronic device or a method for recovering lost information.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a "beyond 4G network" communication system or a "post long term evolution (post LTE)" system.

The 5G communication system is considered to be implemented in ultrahigh frequency bands (e.g., 60 gigahertz (GHz) bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

To improve the efficiency of equipment in wireless communication, separation of a control plane device and a user plane device was introduced, and an interface (Sx Interface) was added between a control plane and a user plane for the purpose of information exchange between the two devices.

The control plane may use the Sx interface to perform an operation of making a request to the user plane for a usage amount or transmitting the usage amount from the user plane to the control plane when a specific condition (a trigger condition) is met.

During the above operation, a message may be lost between the control plane→←the user plane. In order to compensate for this loss, the standard defines retransmission and time-out recognition through a timer. (see 3rd generation partnership project long term evolution (3GPP) 29.244-6.4)

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and a method for efficiently recovering loss of usage amount information transmitted between devices in a wireless communication system.

Additional aspects will be set forth in part in the description which follows and, in part, will be apparent from the description, or may be learned by practice of the presented embodiments.

In accordance with an aspect of the disclosure, a method of operating a session management function (SMF) is provided. The method includes transmitting, based on a user plane function (UPF) and session establishment, a request message to the UPF, receiving a response message from the UPF, determining, based on the response message, whether there is a lost usage amount, and transmitting recovered usage amount information to an online charging system (OCS) in case that there is the lost usage amount, wherein the response message includes current usage amount information and cumulative usage amount information of the UPF.

The device and the method according to various embodiments of the disclosure may provide an effect of improving accuracy of data transmission by efficiently recovering lost information in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
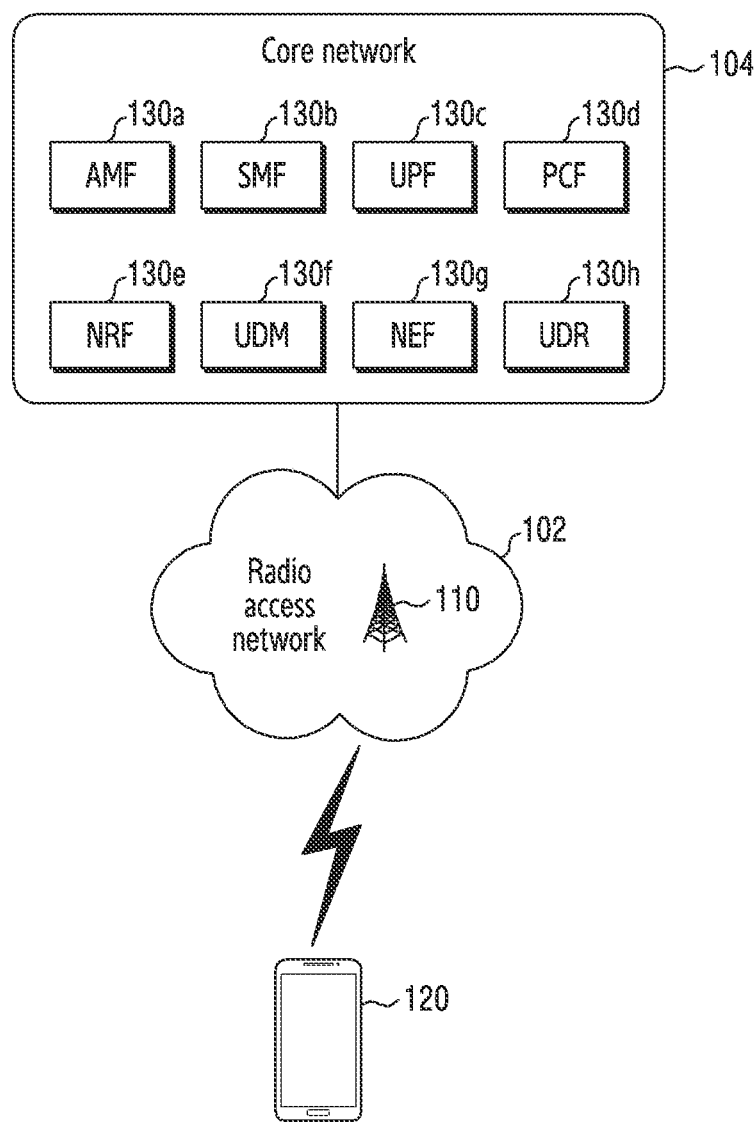
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Such terms as those defined in a generally used dictionary may be interpreted to have the meanings equal to the contextual meanings in the relevant field of art, and are not to be interpreted to have ideal or excessively formal meanings unless clearly defined in the disclosure. Even the term defined in the disclosure should not be interpreted to exclude embodiments of the disclosure.

Various embodiments of the disclosure will be described based on an approach of hardware. However, various embodiments of the disclosure include a technology that uses both hardware and software, and thus the various embodiments of the disclosure may not exclude the perspective of software.

The disclosure describes a technology for reducing a delay, which a user experiences, by reducing the time required for switching a communication network in a wireless communication system through a device and a method for switching the communication network, based on the quality of communication between an electronic device and an access point in the wireless communication system.

In the following description, the terms "physical channel" and "signal" may be interchangeably used with the term "data" or "control signal". In an example, a physical downlink shared channel (PDSCH) is a term referring to a physical channel over which data is transmitted, but the PDSCH may be used to refer to data. In the disclosure, the expression "transmit a physical channel" may be construed as having the same meaning as "transmit data or a signal over a physical channel".

In the following description, higher signaling may mean a signal transmission method in which a base station transmits a signal to an electronic device by using a downlink data channel in a physical layer or an electronic device transmits a signal to a base station by using an uplink data channel in a physical layer. The higher signaling may be understood as radio resource control (RRC) signaling or a media access control (MAC) control element (CE).

In an embodiment, as used in the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

Additionally, some embodiments of the disclosure will be described using terms employed in some communication standards (e.g., the 3rd generation partnership project (3GPP)), but they are only for the sake of illustration. The embodiments of the disclosure may also be easily applied to other communication systems through modifications.

FIG. 1 illustrates a wireless communication system according to an embodiment of the disclosure.

Referring to FIG. 1, the wireless communication system includes a radio access network (RAN) 102 and a core network (CN) 104.

A radio access network 102 is a network directly connected to a user device, for example, a terminal 120, and is an infrastructure that provides wireless access to the terminal 120. The radio access network 102 may include a set of multiple base stations including a base station 110, and the multiple base stations may communicate with each other through interfaces formed between each other. At least some of the interfaces between the multiple base stations may be wired or wireless. In an embodiment, the base station 110 may have a structure in which the base station 110 is separated into a central unit (CU) and a distributed unit (DU). In this case, one CU may control multiple DUs. The base station 110 may be referred to as an "access point (AP)", "next generation node B (gNB)", "5G node", "wireless point", "transmission/reception point (TRP)", or other terms having equivalent technical meaning, in addition to a base station. In another embodiment, the terminal 120 accesses the radio access network 102 and communicates with the base station 110 through a radio channel. The terminal 120 may be referred to as "user equipment (UE)", "mobile station", "subscriber station", "remote terminal", "wireless terminal", "user device", or other terms having equivalent technical meanings, in addition to a terminal.

The core network 104 is a network for managing the entire system, and controls the radio access network 102, and processes data and control signals transmitted to and received from the terminal 120 over the radio access network 102. In another embodiment, the core network 104 performs various functions such as user plane and control plane control, mobility processing, subscriber information management, charging, interworking with other types of systems (e.g., a long-term evolution (LTE) system). In order to perform the various functions described above, the core network 104 may include multiple functionally separated entities having different network functions (NFs). In an example, the core network 104 may include an access and mobility management function (AMF) 130*a*, a session management function (SMF) 130*b*, a user plane function (UPF) 130*c*, a policy and charging function (PCF) 130*d*, a network repository function (NRF) 130*e*, user data management (UDM) 130*f*, a network exposure function (NEF) 130*g*, and a unified data repository (UDR) 130*h*.

In yet another embodiment, the terminal 120 is connected to the radio access network 102 so as to access an AMF 130*a* for performing a mobility management function of the core network 104. The AMF 130*a* is a function or device responsible for both access to the radio access network 102 and mobility management of a UE. The SMF 130*b* is an NF for managing a session. In still another embodiment, the AMF 130*a* is connected to the SMF 130*b*, and the AMF 130*a* routes session-related messages for the terminal 120 to the SMF 130*b*. The SMF 130*b* is connected to the UPF 130*c*, allocates user plane resources to be provided to the terminal 120, and establishes a tunnel for data transmission between the base station 110 and the UPF 130*c*. The PCF 130*d* controls information related to a policy and charging for a session used by the terminal 120. The NRF 130*e* performs a function of storing information about NFs installed in a mobile communication operator's network and notifying of the stored information. In another embodiment, the NRF 130*e* may be connected to all NFs. When each NF starts driving in the operator's network, the NRF 130*e* is registered with the NRF 130*e*, so that the NRF 130*e* is notified that the NF is driven in the network. The UDM 130*f* is an NF for performing a role similar to that of a home subscriber server (HSS) of a 4G network, and stores subscription information of the terminal 120 or a context used by the terminal 120 in the network.

In an embodiment, the NEF 130*g* plays the role of connecting a 3rd party server to an NF in a 5G mobile communication system. Also, the NEF 130*g* plays the role of providing data to the UDR 130*h*, updating data, or acquiring data. The UDR 130*h* performs a function of storing subscription information of the terminal 120, storing policy information, storing data exposed to the outside, or storing information necessary for a 3rd party application. Additionally, the UDR 103*h* plays the role of providing stored data to other NFs.

Figure 2:
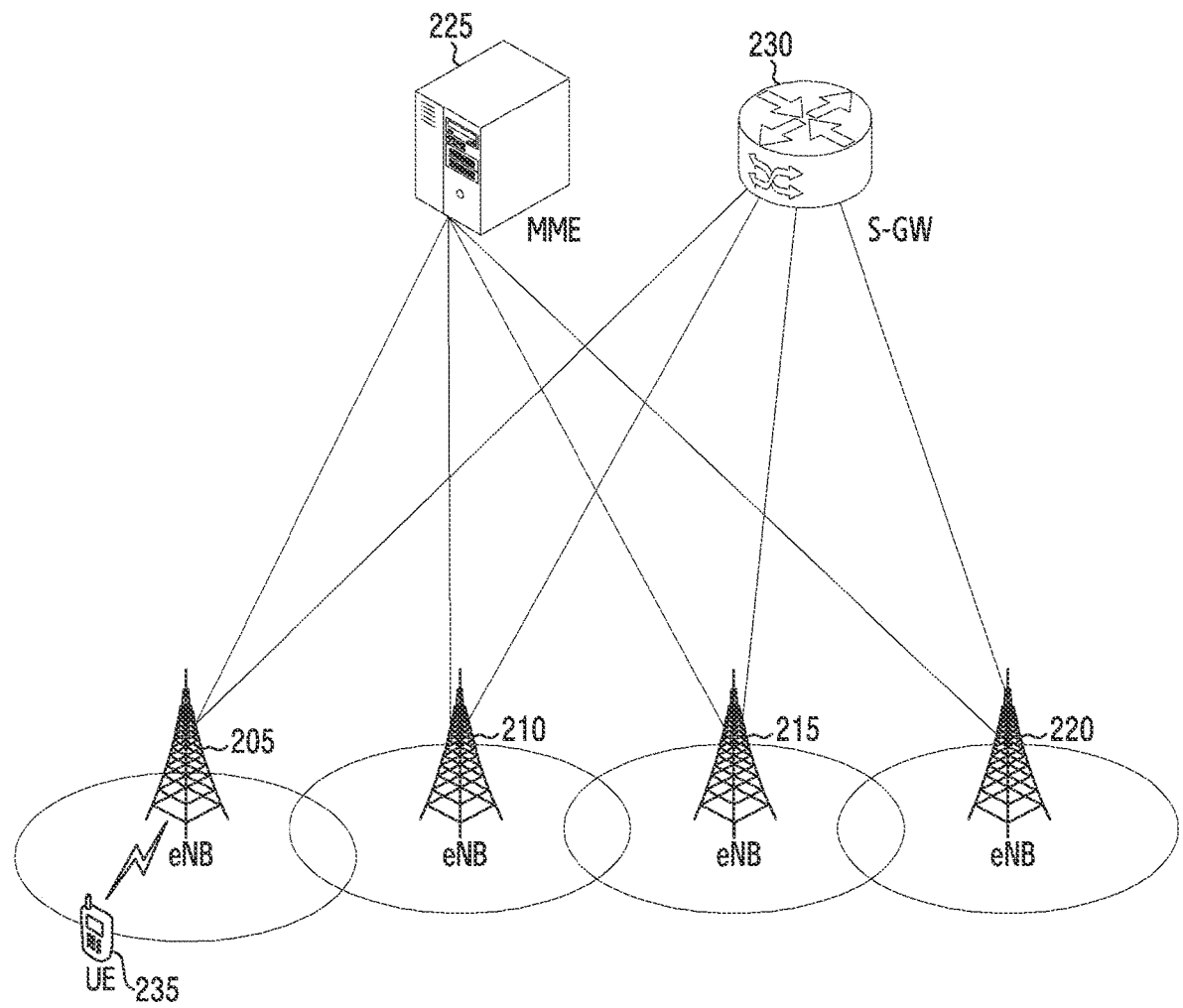
FIG. 2 illustrates an example of a wireless communication system according to an embodiment of the disclosure.

FIG. 2 illustrates an example of a wireless communication system according to an embodiment of the disclosure.

Referring to FIG. 2, a wireless communication system includes multiple base stations 205, 210, 215, and 220, a mobility management entity (MME) 225, and a serving-gateway (S-GW) 230. A user terminal (user equipment, hereinafter, "UE" or "terminal") 235 accesses an external network through base station 205, 210, 215, or 220 and a S-GW 230.

In an embodiment, the base stations 205, 210, 215, and 220 are access nodes of a cellular network and provide wireless access to terminals accessing the network. That is, in order to service users' traffic, the base stations 205, 210, 215, and 220 collect and schedule state information of terminals, such as a buffer state, an available transmission power state, and a channel state, thereby supporting connection between the terminals and a core network (CN). The MME 225 is a device responsible for various control functions as well as a mobility management function for a terminal, and is connected to multiple base stations. The S-GW 230 is a device that provides a data bearer. Additionally, the MME 225 and the S-GW 230 may further perform authentication, bearer management, etc. for a terminal accessing the network, and process a packet arriving from the base station 205, 210, or 215, and 220 or a packet to be transmitted to the base station 205, 210, 215, or 220.

Figure 3:
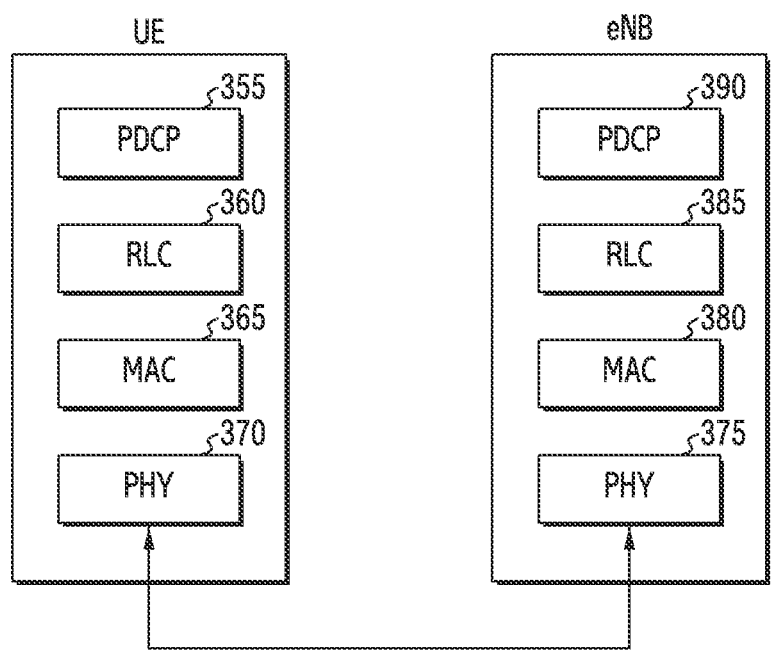
FIG. 3 illustrates an example of a radio protocol structure in a wireless communication system according to an embodiment of the disclosure.

FIG. 3 illustrates an example of a radio protocol structure in a wireless communication system according to an embodiment of the disclosure.

Referring to FIG. 3, in a terminal and eNB, wireless protocols of an LTE system each include packet data convergence protocols (PDCPs) 355 and 390, radio link controls (RLCs) 360 and 385, and medium access controls (MACs) 365 and 380. The packet data convergence protocols (PDCPs) 355 and 390 are responsible for operations such as IP header compression/recovery, and the radio link controls (RLCs) 360 and 395 reconstruct a PDCP packet data unit (PDU) in an appropriate size. In an embodiment, the MACs 365 and 380 are connected to multiple RLC layer devices configured in one terminal, and perform operations of multiplexing RLC PDUs to MAC PDUs and demultiplexing RLC PDUs from MAC PDUs. Physical layers 370 and 375 channel-code and modulate higher-layer data, convert the higher-layer data into an orthogonal frequency-division multiplexing (OFDM) symbol, and transmit the OFDM symbol through a radio channel, or demodulate and channel-decode OFDM symbols received through the radio channel, and transmit the OFDM symbol to a higher layer. In addition, hybrid automatic repeat request (HARQ) is used for additional error correction in the physical layers, and a reception end transmits 1-bit information on whether a packet transmitted by a transmission end has been received. This is referred to as HARQ acknowledgment (ACK)/negative acknowledgement (NACK) information. Downlink HARQ ACK/NACK information for uplink data transmission is transmitted through a physical channel (physical hybrid-ARQ indicator channel (PHICH)) in case of LTE. Although not shown in the drawing, there is a radio resource control (RRC) layer above a PDCP layer of each of a terminal and a base station, and the RRC layer may transmit and receive access and measurement-related configuration control messages in order to control radio resources.

The physical (PHY) layer may be formed of one or multiple frequencies/carriers, and a technique for simultaneously configuring and using multiple frequencies is referred to as carrier aggregation (hereinafter, referred to as CA). When compared with the technique of using only one carrier for communication between a terminal (or a user equipment (UE)) and a base station (evolved-universal terrestrial radio access network (E-UTRAN) NodeB (eNB)), the CA technique may use a main carrier and one or multiple additional subcarriers, thereby significantly increasing the transmission amount by the number of subcarriers. In LTE, a cell in a base station using a main carrier is called a main cell or a primary cell (PCell), and a cell in a base station using a subcarrier is called a subcell or a secondary cell (SCell).

In an embodiment, the retransmission operation defined in the 3GPP standard may be a sufficient solution for a message that is lost with a single-shot and for a message that is lost while communication in the network is smooth. However, the limitations of user datagram protocol (UDP) communication and the finite number of retransmissions supported in a packet forwarding control protocol (PFCP) step may not be a solution for all lost messages, and the waiting time required for retransmission itself may cause congestion.

For example, when a usage amount is retransmitted through a retransmission operation, the total number of messages introduced into the network may temporarily increases, thereby causing network congestion and delay of messages delivered to other devices. A small number of retransmission operations in a configured short period of time may not be a sufficient solution for continuous message loss at the time network congestion occurs, and a recovery or correction operation for the usage amount of the lost message is not defined.

An aspect of the disclosure is to, with respect to the problem of intra-network message loss that cannot be supported by retransmission, transmit cumulative usage amount information between SMF and UPF by using IEs other than an IE defined in the existing 3GPP and minimize usage amount loss due to the message loss by using the difference value of cumulative usage amount.

In another embodiment, the disclosure is related to an operation of recognizing and recovering a lost usage amount in case of message loss including usage amounts transmitted in an Sx/N4 interface.

Usage amounts existing in the lost message are recognized, recovered, and transmitted separately or together with an existing usage amount to prevent omission of a usage amount settled by a counterpart station (charging equipment). In relation to a recognized cumulative usage amount, usage amounts are summed up based on events that may affect rate plan settlement, such as CHANGE_CONDITION Event, and transmitted.

This implies that a separate cumulative usage amount IE is used as a comparison value other than the IE configured as a standard.

According to one embodiment, a new message is not added in order to transmitting lost message information, and thus it is possible to provide an effect of recovering a lost message usage amount without causing congestion in a network.

Additionally, when the loss of a usage amount is minimized, the value of N1/T1 may be minimized, so when temporary network congestion occurs, the number of incoming retransmission messages may be decreased, thereby shortening the network congestion period or reducing the network congestion itself.

Figure 4:
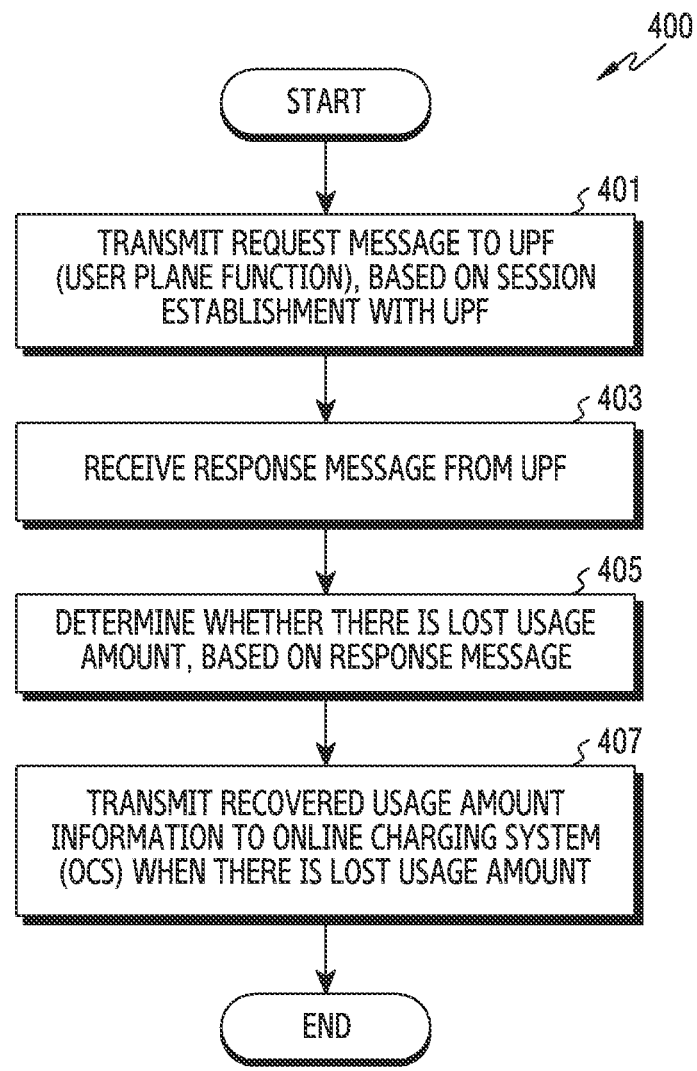
FIG. 4 illustrates an operation for detecting and recovering message loss in a wireless communication system according to an embodiment of the disclosure.

FIG. 4 illustrates an operation for detecting and recovering message loss in a wireless communication system according to an embodiment of the disclosure.

Referring to FIG. 4, a description 400 may be made of an operation of an SMF for detecting a lost usage amount based on information received from a UDF and transmitting a message for recovering the lost usage amount.

In operation 401, the SMF may transmit a request message to the UPF, based on session establishment. The transmission of the request message may, for example, be an operation performed after session establishment between the SMF and the UPF. The request message may refer to a request message associated with a session. In another example, the request message may be a request message, which is related to a session established between the UPF and the SMF, such as a session deletion request, a session modification request, or a session report request.

In operation 403, the SMF may receive a response message from the UPF.

The response message which the SMF receives from the UPF may be received after the transmission of the request message. The response message may, for example, refer to a response message associated with a session established between the UPF and the SMF. In another example, the response message may be a response message, which is related to a session established between the UPF and the SMF, such as a session deletion response, a session modification response, or a session report response.

The response message received by the SMF may include usage amount information. The usage amount information may be information about the amount of traffic used by the UPF. The usage amount information may be divided into current usage amount information and cumulative usage amount information of the UPF. In an embodiment, the current usage amount information may be information about the amount of traffic used by the UPF but not reported, and the cumulative usage amount information may be the total amount of traffic used by the UPF from call setup to call deletion.

In operation 405, the SMF may determine whether there is a lost usage amount, based on the response message received from the UPF.

The lost usage amount may refer to information about the amount of traffic used by the UPF but not reported to the SMF. When there is a lost usage amount, the UPF may report the amount of traffic to a charging server while omitting the lost usage amount.

The SMF may determine existing cumulative usage amount information that has been pre-stored. In an embodiment, the SMF may determine whether there is a lost usage amount, based on the determined existing cumulative usage amount information and the usage amount information received from the UPF. Specifically, it is determined whether the sum of a usage amount corresponding to the existing cumulative usage amount information and a usage amount corresponding to the current usage amount information in the usage amount information received from the UPF is equal to a usage amount corresponding to the cumulative usage amount information received from the UPF. In another embodiment, when the sum is equal to the usage amount corresponding to the cumulative usage amount information received from the UPF, it may be determined that there is no lost usage amount. In yet another embodiment, when the sum value is smaller than the usage amount corresponding to the cumulative amount information, a usage amount corresponding to the difference value therebetween may be determined to be a lost amount.

In operation 407, the SMF may transmit recovered usage amount information to an online charging system (OCS) in response to determining that there is a lost usage amount.

The recovered usage amount information may, for example, be the lost usage amount determined in operation 405 and the usage amount corresponding to the current usage amount information determined based on the response message received from the UPF.

Figure 5:
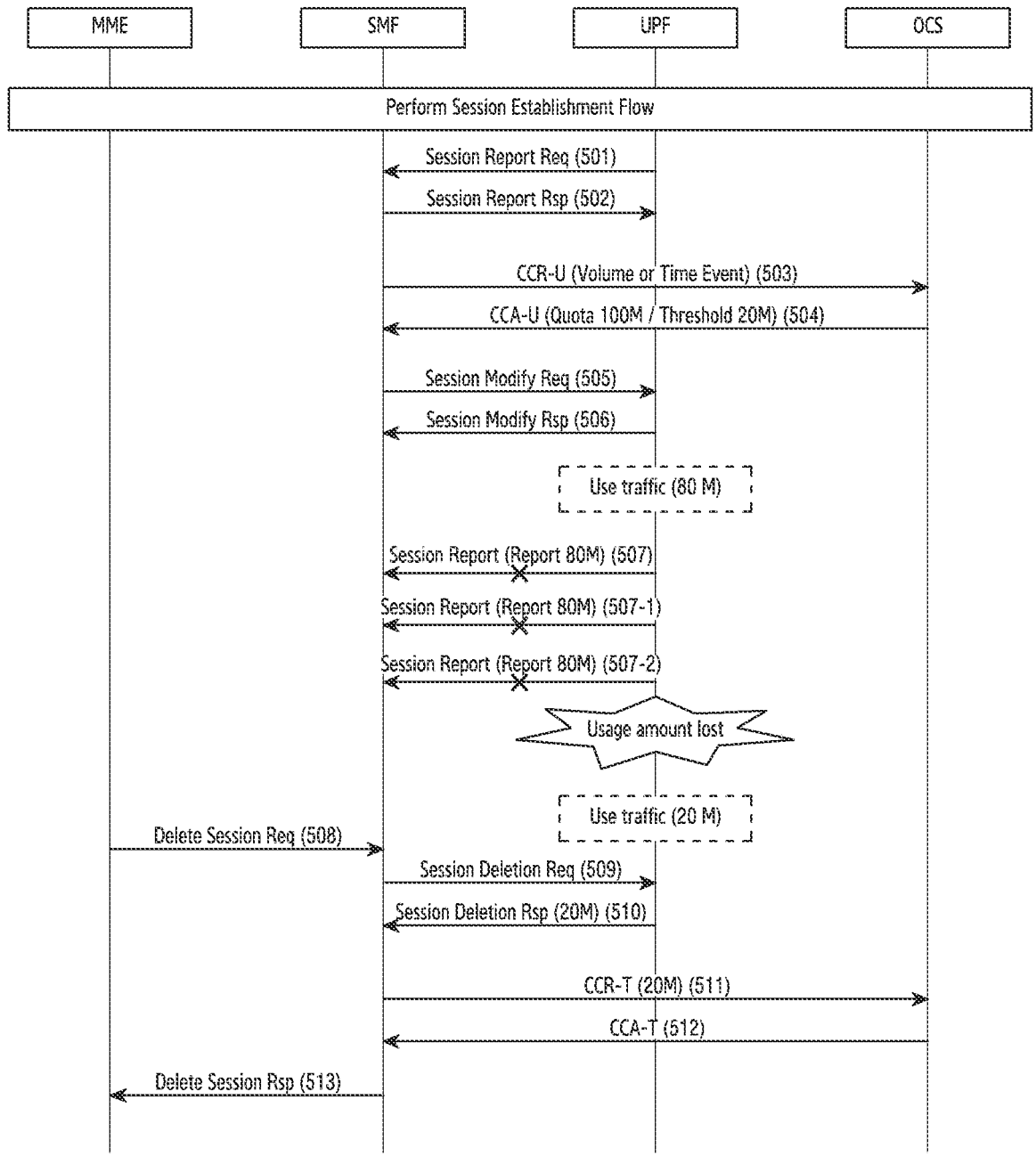
FIG. 5 illustrates processing usage amount loss through a retransmission operation in a wireless communication system according to an embodiment of the disclosure.

FIG. 5 illustrates processing usage amount loss through a retransmission operation in a wireless communication system according to an embodiment of the disclosure.

Referring to FIG. 5, problems that may occur in the process of processing usage amount loss through a retransmission operation may be described. The operations shown in FIG. 5 may be basically associated with operations after a call is generated. Message loss that may occur in the Sx/N4 interface when generating a call may be unrelated to usage amount loss. In an embodiment, when a retransmission operation is not completed successfully in operations 7 to 7-2 among the operations included in FIG. 5, a used usage amount may be lost, and an error of miscalculating an actually used usage amount of 100 as a usage amount of only 20 M may be made.

The retransmission operation is not completed successfully in a situation of continuous message loss occurring at the time network congestion occurs. In another embodiment, when message transmission fails even when the retransmission operation has been performed more than the maximum number of times of retransmission in case of message transmission failure, it may be determined that the retransmission operation has not been successfully completed. The detailed operation is described as follows.

In operation 501, GWU (UPF) may transmit a session report request message to GWC (SMF). The session report request message may be transmitted when a usage amount used by the UPF corresponds to a trigger condition. In another embodiment, the session report request message may include information such as usage amount report and trigger information, Usage Reporting Rules (URR) sequence number, URR usage amount traffic occurrence start/end time, and the like.

The usage amount may be information related to traffic used in UPF.

In operation 502, the SMF may transmit a session report response message to the UPF. Additionally, the SMF may generate a message to be transmitted to an OCS, based on usage amount information included in the session report request message received from the UPF.

In an example, the SMF may transmit a message including MSCC/USU information to the OCS, based on usage amount and time event information included in the received session report request message.

In operation 503, the OCS receives usage amount and time event information through a Credit Control Request (CCR).

In operation 504, the OCS may identify the usage amount received through the CCR, may determine the remaining quota based on the identified usage amount, and may transmit event occurrence conditions and a quota available to a subscriber to the SMF. The event occurrence conditions may be information related to a threshold usage amount (a threshold). In one example, the OCS may configure the threshold usage amount to be 20 M and the quota to be 100 M, and may transmit the pertinent information through a CCA to SMF.

In operation 505, the SMF may transmit a session modification request message to the UPF. The session modification request message may include quota information and event information received from the OCS in Update URR.

In operation 506, the UPF may transmit a session modification response message to the SMF. The session modification response message may, for example, include information confirming that the session modification request message transmitted from the SMF has been normally received and processed.

When the UPF transmits the session modification response message to the SMF and then the amount of traffic used by the UPF reaches the threshold usage amount, a session report request may occur. In an example, when the threshold usage amount is 80 M and when the amount of traffic used by the UPF reaches 80 M after operation 506, the UPF may generate a session report request message to be transmitted to the SMF.

In operation 507, the UPF may transmit a session report message to the SMF. The session report message may, for example, include information indicating that the amount of traffic used has reached the threshold usage amount. Specifically, the session report message may include information about the amount of traffic used by the UPF after operation 506. For example, the UPF may include, in the session report message, information indicating that the UPF used traffic corresponding to 80 M.

In operation 507-1, the UPF may transmit a session report message to the SMF again. Wen it is identified that a response to the session report message transmitted in operation 507 has not arrived, the UPF may transmit the same message as the session report message transmitted in operation 507 to the SMF again.

In operation 507-2, the UPF may transmit a session report message to the SMF again. Specifically, when it is identified that a response to the session report message transmitted in operation 507-1 has not arrived, the UPF may transmit the same message as the session report message transmitted in operation 507 to the SMF again.

The UPF may repeat operation 507 until the maximum number of times of retransmission N1 is reached, and when transmission of the session report message reaches N1, the existing usage amount may not be reported any more. Information about 80 M, which is the amount of traffic used by the UPF, and the threshold usage amount may be lost. Therefore, the SMF may not recognize that traffic corresponding to 80 M has been used.

When the UPF additionally uses 20 M left after subtracting 80 M used from the total quota 100 M, traffic no longer flows, and thus a call deletion operation for reconnection may be performed by a user.

In operation 508, the SMF may receive a delete session request from an MME.

In operation 509, the SMF may transmit a session deletion request message to the UPF in response to the reception of the session deletion request from the MME. In an embodiment, this may be for performing call deletion through the release of existing resources.

In operation 510, the UPF may transmit a session deletion response message to the SMF. The session deletion response message may include a usage amount up to now and related information. In an example, when the amount of traffic used by the UPF reaches the threshold usage amount and when the UPF additionally uses 20 M after transmission of threshold usage amount information fails, the session deletion response message may include information about 20 M that has been additionally used.

In operation 511, the SMF may transmit the received usage amount to the OCS.

In operation 512, the SMF may receive CCA-T from the OCS and terminate the session.

In operation 513, the SMF may transmit a delete session response to the MME, and the MME may normally terminate the session.

Figure 6:
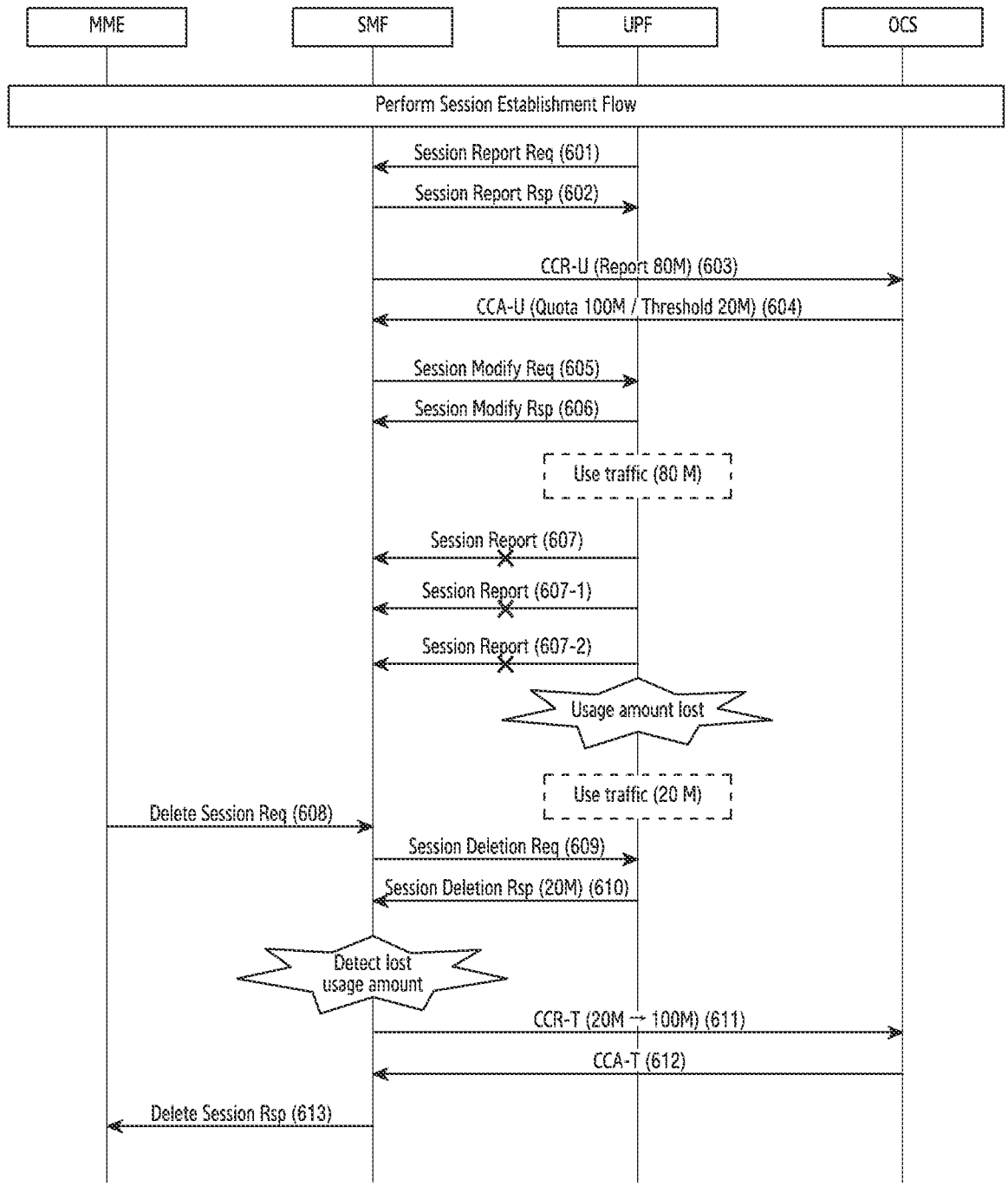
FIG. 6 illustrates a recovery operation when a session request message is lost in a wireless communication system according to an embodiment of the disclosure.

FIG. 6 illustrates a recovery operation when a session request message is lost in a wireless communication system according to an embodiment of the disclosure.

Referring to FIG. 6, in a message loss scenario based on a retransmission operation, a recovery operation when a session report request message is lost may be described.

Referring to FIG. 6, potential problems in processing usage amount loss through a retransmission operation may be described. The operations shown in FIG. 6 may be basically associated with operations after a call is generated. Message loss that may occur in the Sx/N4 interface when generating a call may be unrelated to usage amount loss. In an embodiment, when a retransmission operation is not completed successfully in operations 607, 607-1, and 607-2 among the operations included in FIG. 6, the amount of used traffic may be lost, and according to one embodiment, the UPF supports a service as much as 20 M after the loss of the amount of used traffic. Then, whether there is a lost usage amount and how much the lost usage amount is may be identified through a cumulative usage amount and a usage amount received at the time the call is deleted and then the lost usage amount may be recovered, and the recovered usage amount may be transmitted to an OCS, so usage amount loss may be prevented.

Each operation described in detail below is an aspect, and each of values (e.g., 20 M, 400 M, etc.) corresponding to the cumulative usage amount or a traffic amount may be changeably applied depending on a traffic situation or environment.

In operation 601, GWU (UPF) may transmit a session report request message to GWC (SMF). The session report request message may be transmitted when a usage amount used by the UPF corresponds to a trigger condition. In another embodiment, the session report request message may include information such as usage amount report and trigger information, URR sequence number, URR usage amount traffic occurrence start/end time, and the like. The usage amount may be information related to traffic used by the UPF.

In addition, the session report request message may include the amount of traffic used (e.g., 80 M) and a cumulative usage amount (e.g., 300 M).

In operation 602, the SMF may transmit a session report response message to the UPF. Additionally, the SMF may generate a message to be transmitted to an OCS, based on usage amount information included in the session report request message received from the UPF.

The SMF may add a new usage amount (80 M) to an existing cumulative usage amount (220 M), and may, for example, identify whether the summed usage amount is equal to the newly received cumulative usage amount (300 M).

In operation 603, in response to identifying that the summed usage amount is equal to the newly received cumulative usage amount, the SMF may determine the received usage amount to be normal, and may, for example, transmit a usage amount of 80 M to the OCS.

In operation 604, the OCS may identify the usage amount received through a CCR, may determine the remaining quota based on the identified usage amount, and may transmit event occurrence conditions and a quota available to a subscriber to the SMF. The event occurrence conditions may be information related to a threshold usage amount (a threshold). In an example, the OCS may configure the threshold usage amount to be 20 M and the quota to be 100 M, and may transmit the pertinent information through a CCA to the SMF.

In operation 605, the SMF may transmit a session modification request message to the UPF. The session modification request message may include quota information and event information received from the OCS in Update URR. Additionally, the session modification request message may include information about the usage amount and the event occurrence conditions received from the OCS.

In operation 606, the UPF may transmit a session modification response message to the SMF. The session modification response message may, for example, include information confirming that the session modification request message transmitted from the SMF has been normally received and processed.

In an embodiment, when the UPF transmits the session modification response message to the SMF and then the amount of traffic used by the UPF reaches the threshold usage amount, a session report request may occur. For example, when the threshold usage amount is 80 M and when the amount of traffic used by the UPF reaches 80 M after operation 506, the UPF may generate a session report request message to be transmitted to the SMF.

In operation 607, the UPF may transmit a session report message to the SMF. The session report message may include information indicating that the amount of traffic used has reached the threshold usage amount. Specifically, the session report message may include information about the amount of traffic used by the UPF after operation 506. In an example, the UPF may include, in the session report message, information indicating that the UPF used traffic corresponding to 80 M.

Additionally, the UPF may include information about cumulative usage amount of traffic used so far in the session report message. For example, when a cumulative usage amount already used by the UPF is 300 M before the traffic usage amount reaches the threshold usage amount (e.g., 80 M), information about a cumulative usage amount of 380 M, which is the sum of the existing cumulative usage amount of 300 M and the threshold usage amount of 80 M, may be included in the session report message together.

In operation 607-1, the UPF may transmit a session report message to the SMF again. When it is identified that a response to the session report message transmitted in operation 607 has not arrived, the UPF may transmit the same message as the session report message transmitted in operation 607 to the SMF again.

In operation 607-2, the UPF may transmit a session report message to the SMF again. Specifically, when it is identified that a response to the session report message transmitted in operation 607-1 has not arrived, the UPF may transmit the same message as the session report message transmitted in operation 607 to the SMF again.

The UPF may repeat operation 607 until the maximum number of times of retransmission N1 is reached, and when transmission of the session report message reaches N1, the existing usage amount may not be reported any more. Information about 80 M, which is the amount of traffic used by the UPF, and the threshold usage amount may be lost. Therefore, the SMF may not recognize that traffic corresponding to 80 M has been used.

When the UPF additionally uses 20 M left after subtracting 80 M used from the total quota 100 M, traffic no longer flows, and thus a call deletion operation for reconnection may be performed by a user.

In operation 608, the SMF may receive a delete session request from an MME.

In operation 609, the SMF may transmit a session deletion request message to the UPF in response to the reception of the session deletion request message from the MME. This may be for performing call deletion through the release of existing resources.

In operation 610, the UPF may transmit a session deletion response message to the SMF. The session deletion response message may include a usage amount up to now and related information. In an example, when the amount of traffic used by the UPF reaches the threshold usage amount and when the UPF additionally uses 20 M after transmission of threshold usage amount information fails, the session deletion response message may include information about 20 M that has been additionally used.

Additionally, the session deletion response message may include cumulative usage amount information. The cumulative usage amount information may include information corresponding to a total cumulative usage amount (e.g., 400

M) obtained by adding the traffic amount (e.g., 20 M), additionally used by the UPF after retransmission failure, to the cumulative usage amount (e.g., 380 M) included in the session report message.

At this time, the SMF may identify the usage amount, based on the session deletion response message received from the UPF. In another embodiment, the SMF may identify that the total cumulative usage amount transmitted from the UPF is 400 M, while it is identified that the identification that the cumulative usage amount is 320 M (300 M+20 M), which is the sum of the existing cumulative usage amount of 300 M and the usage amount of 20 M received from the UPF. In this case, the SMF recognizes a lost usage amount of 80 M.

In operation 611, the SMF may transmit usage amount information to the OCS. The usage amount information transmitted to the OCS may include information about the lost usage amount. When the lost usage amount recognized by the SMF is 80 M, the usage amount information transmitted to the OCS may include information about a total usage amount corresponding to 100 M obtained by summing 20 M, which is the usage amount received from the UPF, and 80 M, which is the lost usage amount.

In operation 612, the SMF may receive CCA-T from the OCS and may terminate the session.

In operation 613, the SMF may transmit a delete session response to the MME, and the MME may normally terminate the session.

Figure 7:
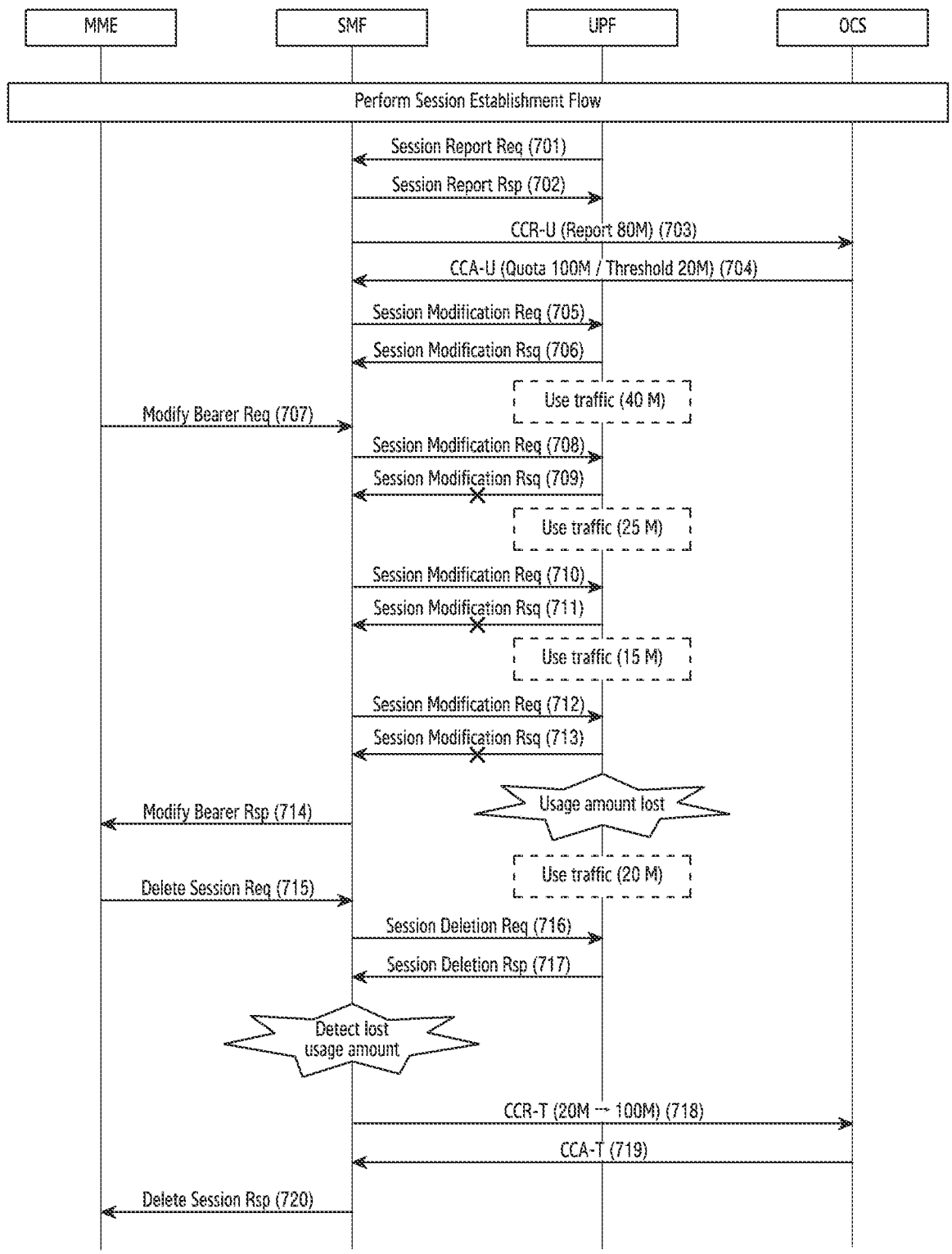
FIG. 7 illustrates a recovery operation when a session modification request message is lost in a wireless communication system according to an embodiment of the disclosure.

FIG. 7 illustrates a recovery operation when a session modification request message is lost in a wireless communication system according to an embodiment of the disclosure.

Referring to FIG. 7, in a message loss scenario based on a retransmission operation, a recovery operation according to another embodiment when a session modification request message is lost may be described.

The operations shown in FIG. 7 may be basically associated with operations after a call is generated. Message loss that may occur in the Sx/N4 interface when generating a call may be unrelated to usage amount loss.

For example, when a retransmission operation is not completed successfully in operations 709, 711, and 713 among the operations included in FIG. 7, a used usage amount may be lost, and the UPF may support a service as much as 20 M after the usage amount is lost.

Whether there is a lost usage amount may be identified through a cumulative usage amount and a usage amount received at the time the call is deleted and then the lost usage amount may be recovered, and the recovered usage amount may be transmitted to an OCS, thereby preventing usage amount loss.

Additionally, even when a session modification response message is normally received during retransmission, a lost usage amount may be recovered through the cumulative usage amount and then transmitted to the OCS, thereby preventing loss.

In operation 701, GWU (UPF) may transmit a session report request message to GWC (SMF). At this time, the session report request message may be transmitted when a usage amount used by the UPF corresponds to a trigger condition. The session report request message may, for example, include information such as usage amount report and trigger information, URR sequence number, URR usage amount traffic occurrence start/end time, and the like. The usage amount may be information related to traffic used by the UPF.

In addition, the session report request message may include the amount of traffic used (e.g., 80 M) and a cumulative usage amount (e.g., 300 M).

In operation 702, the SMF may transmit a session report response message to the UPF. In addition, the SMF may, for example, generate a message to be transmitted to an OCS, based on usage amount information included in the session report request message received from the UPF.

The SMF may add a new usage amount (80 M) to an existing cumulative usage amount (220 M), and may, for example, identify whether the summed usage amount is equal to the newly received cumulative usage amount (300 M).

In operation 703, in response to identifying that the summed usage amount is equal to the newly received cumulative usage amount, the SMF may determine the received usage amount to be normal, and may transmit a usage amount of 80 M to the OCS.

In operation 704, the OCS may identify the usage amount received through a CCR, may determine the remaining quota based on the identified usage amount, and may transmit event occurrence conditions and a quota available to a subscriber to the SMF. In an embodiment, the event occurrence conditions may be information related to a threshold usage amount (a threshold). For example, the OCS may configure the threshold usage amount to be 20 M and the quota to be 100 M, and may transmit the pertinent information through a CCA to the SMF.

In operation 705, the SMF may transmit a session modification request message to the UPF. The session modification request message may include quota information and event information received from the OCS in Update URR. Additionally, the session modification request message may include information about the usage amount and the event occurrence conditions received from the OCS.

In operation 706, the UPF may transmit a session modification response message to the SMF. The session modification response message may, for example, include information confirming that the session modification request message transmitted from the SMF has been normally received and processed.

After the UPF transmits the session modification response message to the SMF, the UPF may use a predetermined amount (e.g., 40 M) of traffic.

In operation 707, the SMF may receive an event from an MME. The event may be received by receiving a modify bearer request from the MME. The modify bearer request may be performed when a Modify Event or Mobility change, such as Location change (CHG)/Serving Node CHG, occurs.

In operation 708, after identifying a registered event trigger, the SMF may determine whether to transmit the usage amount to a charging server. In an embodiment, when it is determined that it is necessary to transmit the usage amount to the charging server, the SMF may perform an operation of making a request to the UPF for the usage amount. The operation of making a request to the UPF for the usage amount may include an operation of transmitting a session modification request message to the UPF.

In operation 709, the UPF may transmit a session modification response message to the SMF in response to the session modification request message received from the SMF. The session modification response message may, for example, include information about the usage amount. The information about the usage amount may include information about a usage amount used up to now (40 M) and a total cumulative usage amount (340 M).

After the transmission of the session modification response message, the UPF may use a predetermined amount of traffic (e.g., 25 M).

In operation 710, when the session modification response message fails to be transmitted, that is, is lost, the SMF may request the usage amount by retransmitting, to the UPF, a session modification request message requesting the usage amount.

In operation 711, a session modification response message may be transmitted to the SMF in response to the session modification request message received from the SMF. The session modification response message may, for example, include information about the usage amount. The information about the usage amount may include information about a currently used usage amount (25 M) and a cumulative usage amount (365 M).

After the transmission of the session modification response message, the UPF may use a predetermined amount (e.g., 15 M) of traffic.

In operation 712, when the session modification response message fails to be transmitted, that is, is lost, the SMF may request the usage amount by retransmitting, to the UPF, a session modification request message requesting the usage amount.

In operation 713, a session modification response message may be transmitted to the SMF in response to the session modification request message received from the SMF. In an embodiment, the session modification response message may include information about the usage amount. The information about the usage amount may include information about a currently used usage amount (15 M) and a cumulative usage amount (380 M).

In the case of usage amount loss due to failure of some of operations 709, 711, and 713, the SMF may identically recognize and recover the lost usage amount through CCR-U rather than CCR-T.

In operation 714, the SMF may transmit a modify bearer response to the MME. Since the SMF failed to receive the session modification response message in the Sx (N4) interface section and could not normally perform an operation for a modification bearer, the modify bearer response may include information indicating the failure.

In operation 715, in response to receiving the modify bearer response message, the MME may identify whether the modify bearer request has failed. Additionally, in response to identifying the failure of the modify bearer request, the MME may make a request to the SMF for session deletion or bearer deletion.

In operation 716, the SMF may transmit a session deletion request message to the UPF in response to the reception of the session deletion request message from the MME. This may be for performing call deletion through the release of existing resources.

In operation 717, the UPF may transmit a session deletion response message to the SMF. The session deletion response message may, for example, include a usage amount up to now and related information. For example, when the amount of traffic used by the UPF reaches the threshold usage amount and when the UPF additionally uses 20 M after transmission of threshold usage amount information fails, the session deletion response message may include information about 20 M that has been additionally used.

Additionally, the session deletion response message may include cumulative usage amount information. The cumulative usage amount information may include information corresponding to a total cumulative usage amount (e.g., 400 M) obtained by adding the traffic amount (e.g., 20 M), additionally used by the UPF after retransmission failure, to the cumulative usage amount (e.g., 380 M) included in the session report message.

At this time, the SMF may identify the usage amount, based on the session deletion response message received from the UPF. The SMF may, for example, identify that the total cumulative usage amount transmitted from the UPF is 400 M, while it is identified that the cumulative usage amount is 320 M (300 M+20 M), which is the sum of the existing cumulative usage amount of 300 M and the usage amount of 20 M received from the UPF. In this case, the SMF recognizes a lost usage amount of 80 M.

In operation 718, the SMF may transmit usage amount information to the OCS. The usage amount information transmitted to the OCS may include information about the lost usage amount. When the lost usage amount recognized by the SMF is 80 M, the usage amount information transmitted to the OCS may include information about a total usage amount corresponding to 100 M obtained by summing 20 M, which is the usage amount received from the UPF, and 80 M, which is the lost usage amount.

In operation 719, the SMF may receive CCA-T from the OCS and may terminate the session.

In operation 720, the SMF may transmit a delete session response to the MME, and the MME may normally terminate the session.

Figure 8:
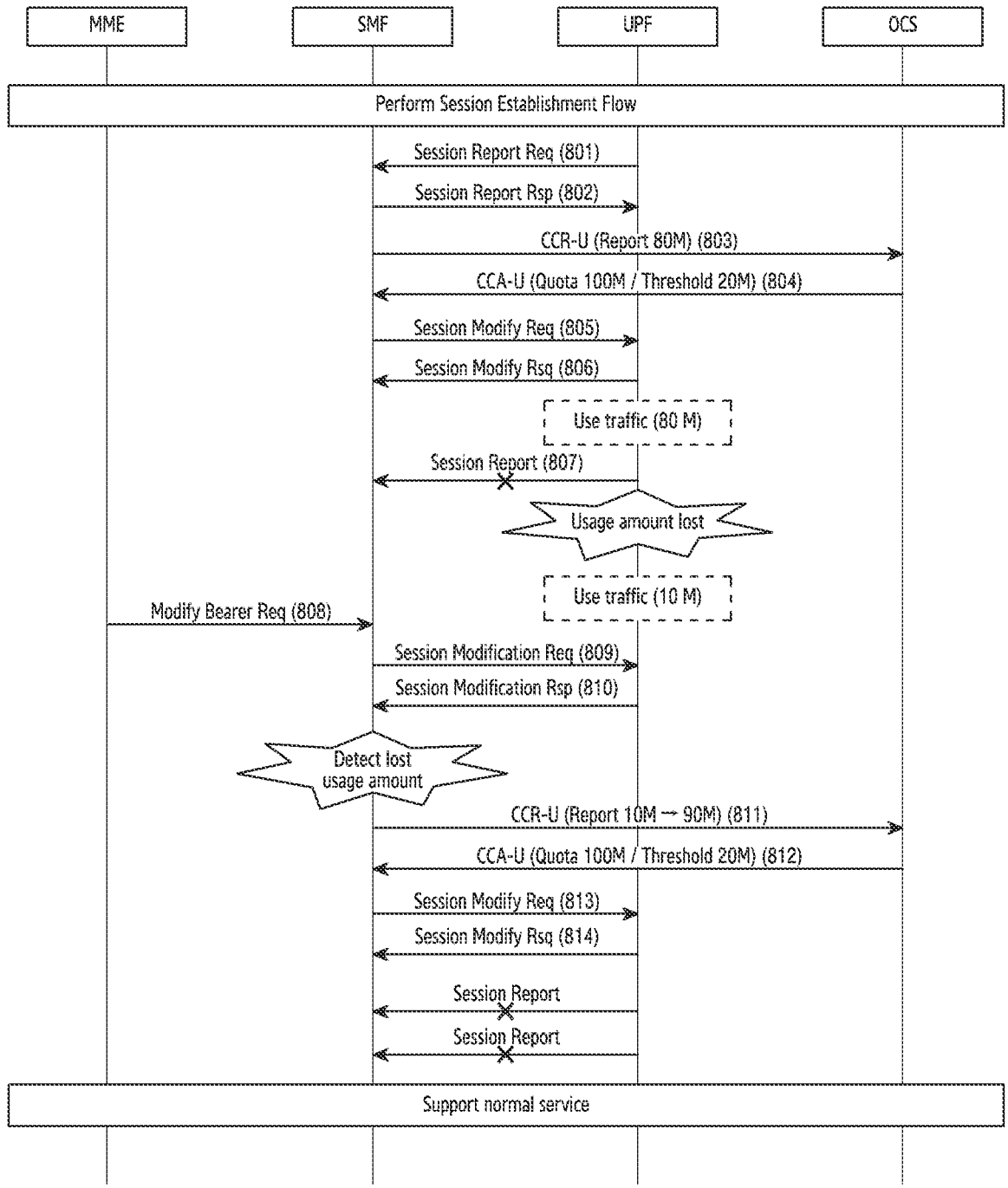
FIG. 8 illustrates a recovery operation when a session report request message is lost in a wireless communication system according to an embodiment of the disclosure.

FIG. 8 illustrates a recovery operation when a session report request message is lost in a wireless communication system according to an embodiment of the disclosure.

Referring to FIG. 8, in a message loss scenario based on a retransmission operation, a description may be made of a recovery operation in case that a session report request message is lost when a session modification request and a session report request occur simultaneously.

The operations shown in FIG. 8 may be basically associated with operations after a call is generated. Message loss that may occur in the Sx/N4 interface when generating a call may be unrelated to usage amount loss.

In an embodiment, when a request for a usage amount is received from an SMF after transmission of a report request message fails in operation 807 among the operations included in FIG. 8, a current usage amount and a lost usage amount may be transmitted to an OCS together to recover a usage amount lost due to message loss. Then, the SMF and a UPF has the same cumulative usage amount, normal service may be performed.

Even when retransmission succeeds after operation 807-1 (not shown) and operation 807-2 (not shown), the cumulative usage amount is smaller than a current cumulative usage amount configured in the SMF, and thus may be ignored.

In operation 801, GWU (UPF) may transmit a session report request message to GWC (SMF). The session report request message may be transmitted when a usage amount used by the UPF corresponds to a trigger condition. The session report request message may, for example, include information such as usage amount report and trigger information, URR sequence number, URR usage amount traffic occurrence start/end time, and the like. The usage amount may be information related to traffic used by the UPF.

In addition, the session report request message may include the amount of traffic used (e.g., 80 M) and a cumulative usage amount (e.g., 300 M).

In operation 802, the SMF may transmit a session report response message to the UPF. In addition, the SMF may generate a message to be transmitted to an OCS, based on usage amount information included in the session report request message received from the UPF.

The SMF may add a new usage amount (80 M) to an existing cumulative usage amount (220 M), and may identify whether the summed usage amount is equal to the newly received cumulative usage amount (300 M).

In operation 803, in response to identifying that the summed usage amount is equal to the newly received cumulative usage amount, the SMF may determine the received usage amount to be normal, and may transmit a usage amount of 80 M to the OCS.

In operation 804, the OCS may identify the usage amount received through a CCR, may determine the remaining quota based on the identified usage amount, and may transmit event occurrence conditions and a quota available to a subscriber to the SMF. The event occurrence conditions may be information related to a threshold usage amount (a threshold). In an example, the OCS may configure the threshold usage amount to be 20 M and the quota to be 100 M, and may transmit the pertinent information through a CCA to the SMF.

In operation 805, the SMF may transmit a session modification request message to the UPF. In an embodiment, the session modification request message may include quota information and event information received from the OCS in Update URR. In addition, the session modification request message may include information about the usage amount and the event occurrence conditions received from the OCS.

In operation 806, the UPF may transmit a session modification response message to the SMF. The session modification response message may, for example, include information confirming that the session modification request message transmitted from the SMF has been normally received and processed.

When the UPF transmits the session modification response message to the SMF and then the amount of traffic used by the UPF reaches the threshold usage amount, a session report request may occur. When the threshold usage amount is 80 M and when the amount of traffic used by the UPF reaches 80 M after operation 806, the UPF may generate a session report request message to be transmitted to the SMF.

In operation 807, the UPF may transmit a session report request message to the SMF. The session report message may include information indicating that the amount of traffic used has reached the threshold usage amount. Specifically, the session report message may include information about the amount of traffic used by the UPF after operation 806. For example, the UPF may include, in the session report message, information indicating that the UPF used traffic corresponding to 80 M.

Additionally, the UPF may include information about cumulative usage amount of traffic used so far in the session report message. For example, when a cumulative usage amount already used by the UPF is 300 M before the traffic usage amount reaches the threshold usage amount (e.g., 80 M), information about a cumulative usage amount of 380 M, which is the sum of the existing cumulative usage amount of 300 M and the threshold usage amount of 80 M, may be included in the session report message together.

When the transmission of the session report request message fails, the UPF may repeatedly retransmit the session report request message. The repeated transmission operations may, for example, be referred to as operation 807-1 and operation 807-2. However, a cumulative usage amount transmitted in operations 807-1 and 807-2 is less than the cumulative usage amount transmitted in operation 810 to be described later, and thus may be determined to be an already transmitted cumulative usage amount and may not be considered.

In operation 808, the SMF may receive an event from an MME. The event may be received by receiving a modify bearer request from the MME. The modify bearer request may be performed when a Modify Event or Mobility change, such as Location CHG/Serving Node CHG, occurs.

In operation 809, after identifying a registered event trigger, the SMF may determine whether to transmit the usage amount to a charging server. When it is determined that it is necessary to transmit the usage amount to the charging server, the SMF may perform an operation of making a request to the UPF for the usage amount. The operation of making a request to the UPF for the usage amount may include an operation of transmitting a session modification request message to the UPF.

In operation 810, the UPF may transmit a session modification response message to the SMF in response to the session modification request message received from the SMF. In an embodiment, the session modification response message may include information about the usage amount. The information about the usage amount may, for example, include information about a usage amount used up to now (10 M) and a total cumulative usage amount (390 M).

In operation 811, the SMF may transmit usage amount information to the OCS. The usage amount information transmitted to the OCS may include information about a lost usage amount. When a lost usage amount recognized by the SMF is 80 M, the usage amount information transmitted to the OCS may include information about a total usage amount corresponding to 90 M obtained by summing 10 M, which is the usage amount received from the UPF, and 80 M, which is the lost usage amount.

In operation 812, the OCS may identify the usage amount received through a CCR, may determine the remaining quota based on the identified usage amount, and may transmit event occurrence conditions and a quota available to a subscriber to the SMF. The event occurrence conditions may be information related to a threshold usage amount (a threshold). In an example, the OCS may configure the threshold usage amount to be 20 M and the quota to be 100 M, and may transmit the pertinent information through a CCA to the SMF.

In operation 813, the SMF may transmit a session modification request message to the UPF. The session modification request message may include quota information and event information received from the OCS in Update URR. Additionally, the session modification request message may include information about the usage amount and the event occurrence conditions received from the OCS.

In operation 814, the UPF may transmit a session modification response message to the SMF. The session modification response message may include information confirming that the session modification request message transmitted from the SMF has been normally received and processed.

When the amount of traffic used by the UPF after the UPF transmits the session modification response message to the SMF reaches the threshold usage amount, a session report request may occur.

Figure 9:
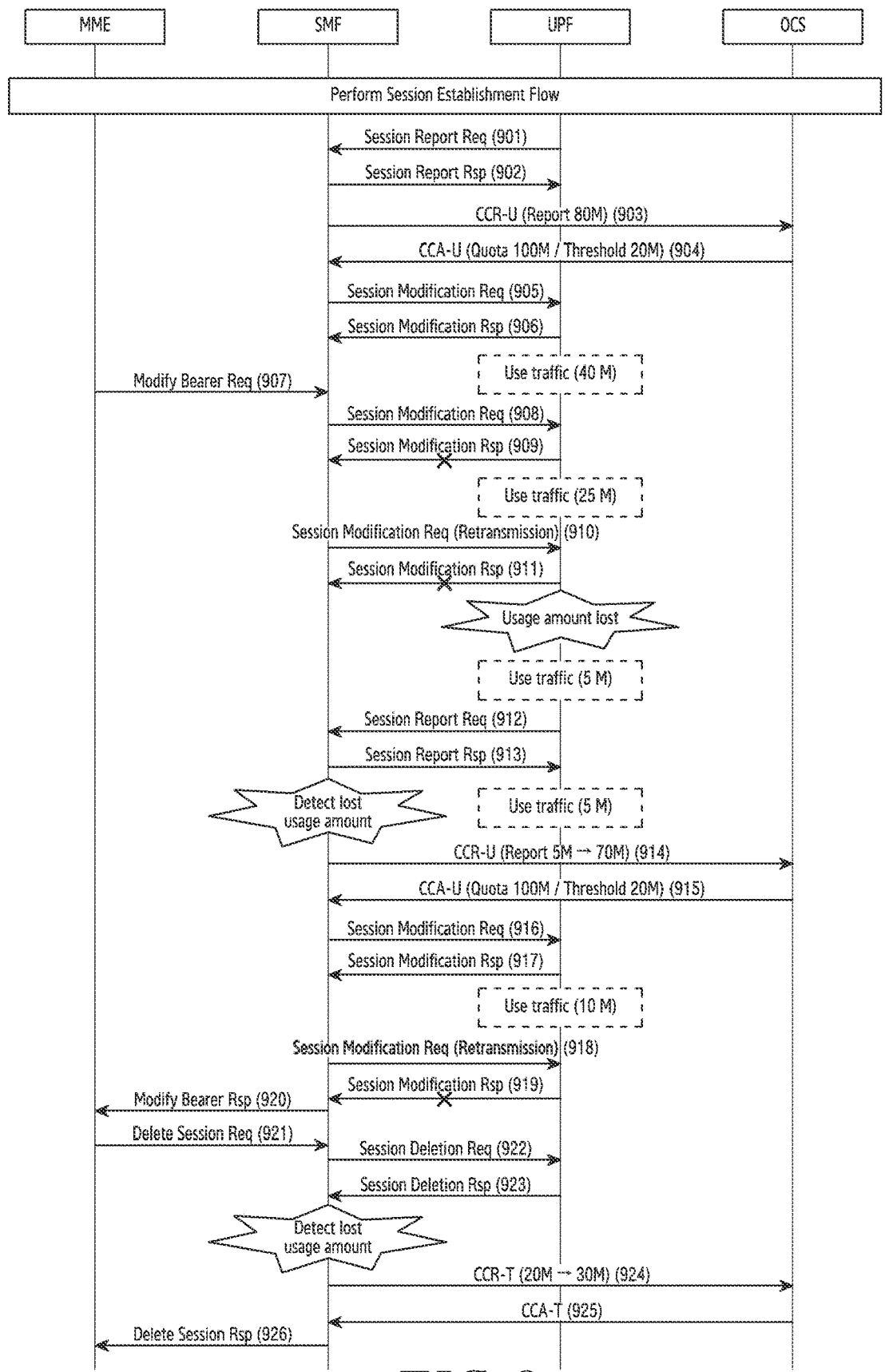
FIG. 9 illustrates a recovery operation when a session modification response message is lost in a wireless communication system according to an embodiment of the disclosure.

FIG. 9 illustrates a recovery operation when a session modification response message is lost in a wireless communication system according to an embodiment of the disclosure.

Referring to FIG. 9, in a message loss scenario based on a retransmission operation, a description may be made of a recovery operation in case that a session modification response message is lost when a session modification request and a session report request occur simultaneously.

The operations shown in FIG. 9 may be basically associated with operations after a call is generated. Message loss that may occur in the Sx/N4 interface when generating a call may be unrelated to usage amount loss.

In an embodiment, when a usage amount report is made from an SMF after transmission of a report request message fails in operation 907 among the operations included in FIG. 9, a current usage amount and a lost usage amount may be transmitted to an OCS together to recover a usage amount lost due to message loss, and then, in a session deletion or bearer deletion operation, the usage amount may also be recovered in the same way, whereby usage amount loss may be prevented.

Usage amount loss occurring at the time of collision between session modification events and usage amount loss occurring between session modification/session deletion messages may correspond to the extended concept of the embodiment shown in FIG. 9.

In operation 901, GWU (UPF) may transmit a session report request message to GWC (SMF). The session report request message may be transmitted when a usage amount used by the UPF corresponds to a trigger condition. The session report request message may, for example, include information such as usage amount report and trigger information, URR sequence number, URR usage amount traffic occurrence start/end time, and the like. The usage amount may be information related to traffic used by the UPF.

In addition, the session report request message may include the amount of traffic used (e.g., 80 M) and a cumulative usage amount (e.g., 300 M).

In operation 902, the SMF may transmit a session report response message to the UPF. Additionally, the SMF may generate a message to be transmitted to an OCS, based on usage amount information included in the session report request message received from the UPF.

The SMF may add a new usage amount (80 M) to an existing cumulative usage amount (220 M), and may identify whether the summed usage amount is equal to the newly received cumulative usage amount (300 M).

In operation 903, in response to identifying that the summed usage amount is equal to the newly received cumulative usage amount, the SMF may determine the received usage amount to be normal, and may, for example, transmit a usage amount of 80 M to the OCS.

In operation 904, the OCS may identify the usage amount received through a CCR, may determine the remaining quota based on the identified usage amount, and may transmit event occurrence conditions and a quota available to a subscriber to the SMF. The event occurrence conditions may be information related to a threshold usage amount (a threshold). In an example, the OCS may configure the threshold usage amount to be 20 M and the quota to be 100 M, and may transmit the pertinent information through a CCA to the SMF.

In operation 905, the SMF may transmit a session modification request message to the UPF. The session modification request message may include quota information and event information received from the OCS in Update URR. In addition, the session modification request message may, for example, include information about the usage amount and the event occurrence conditions received from the OCS.

In operation 906, the UPF may transmit a session modification response message to the SMF. The session modification response message may include information confirming that the session modification request message transmitted from the SMF has been normally received and processed.

In operation 907, the SMF may receive an event from an MME. The event may be received by receiving a modify bearer request from the MME. In another embodiment, the modify bearer request may be performed when a Modify Event or Mobility change, such as Location CHG/Serving Node CHG, occurs.

In operation 908, after identifying a registered event trigger, the SMF may determine whether to transmit the usage amount to a charging server. When it is determined that it is necessary to transmit the usage amount to the charging server, the SMF may perform an operation of making a request to the UPF for the usage amount. The operation of making a request to the UPF for the usage amount may include an operation of transmitting a session modification request message to the UPF.

In operation 909, the UPF may transmit a session modification response message to the SMF in response to the session modification request message received from the SMF. The session modification response message may include information about the usage amount. The information about the usage amount may, for example, include information about a usage amount used up to now (40 M) and a total cumulative usage amount (340 M).

In operation 910, when the session modification response message is lost due to failure to transmit the message, the SMF may request the usage amount by retransmitting, to the UDF, a session modification request message requesting the usage amount. However, the UPF may use some traffic (e.g., 25 M) before the retransmission operation of the SMF.

In operation 911, a session modification response message may be retransmitted to the SMF in response to the session modification request message received from the SMF. In an embodiment, the retransmitted session modification response message may include information corresponding to a current usage amount (25 M) and a cumulative usage amount (365 M). After that, the UPF may use some traffic (e.g., 5 M).

In operation 912, the UPF may transmit a session report request message to the SMF. The session report request message may be transmitted to the SMF based on a timer event such as validity time. The session report request message may include information corresponding to the current usage amount (5 M) and a cumulative usage amount (370 M).

In operation 913, the SMF may transmit a session report response message to the UPF when the SMF receives usage amount information normally without retransmission failure.

In operation 914, the SMF may transmit usage amount information to the OCS. The usage amount information transmitted to the OCS may include information about a lost usage amount. When a lost usage amount recognized by the SMF is 80 M, the usage amount information transmitted to the OCS may include information about a total usage amount corresponding to 70 M obtained by summing 5 M, which is the usage amount received from the UPF, and 65 M, which is the lost usage amount.

The SMF may recognize message loss by comparing a value of the existing cumulative usage amount (e.g., 300 M)+the current usage amount (e.g., 5 M) with the cumulative usage amount (e.g., 370 M) received from the UPF, and may transmit, to OCS, a usage amount (e.g., 70 M) including the lost usage amount rather than the usage amount (e.g., 5 M).

In operation 915, the OCS may identify the usage amount received through a CCR, may determine the remaining quota based on the identified usage amount, and may transmit event occurrence conditions and a quota available to a subscriber to the SMF. The event occurrence conditions may, for example, be information related to a threshold usage amount (a threshold).

In operation 916, the SMF may transmit a session modification request message to the UPF. The session modification request message may include quota information and event information received from the OCS in Update URR. Additionally, the session modification request message may include information about the usage amount and the event occurrence conditions received from the OCS.

In operation 917, the UPF may transmit a session modification response message to the SMF. The session modification response message may, for example, include information confirming that the session modification request message transmitted from the SMF has been normally received and processed.

After the UPF transmits the session modification response message to the SMF, when the amount of traffic used by the UPF reaches the threshold usage amount, a session report request may occur.

In operation 918, as the session modification response message is lost, the SMF may request a usage amount by retransmitting, to the UPF, a session modification request message requesting the usage amount. Before that, the UPF may use some traffic (e.g., 10 M).

In operation 919, the UPF may retransmit a session modification response message in response to the session modification request message received from the SMF. The retransmitted session modification response message may, for example, include information corresponding to the current usage amount (e.g., 10 M) and a cumulative usage amount (e.g., 380 M).

In operation 920, the SMF may transmit a modify bearer response to the MME. Since the SMF failed to receive the session modification response message in the Sx (N4) interface section and could not normally perform an operation for a modification bearer, the modify bearer response may include information indicating the failure.

In operation 921, in response to receiving the modify bearer response message, the MME may identify whether the modify bearer request has failed. Additionally, in response to identifying the failure of the modify bearer request, the MME may make a request to the SMF for session deletion or bearer deletion.

In operation 922, in response to the reception of a session deletion request message from the MME, the SMF may transmit the session deletion request message to the UPF. This may be for performing call deletion through the release of existing resources.

In operation 923, the UPF may transmit a session deletion response message to the SMF. The session deletion response message may include a usage amount up to now and related information. In an example, when the amount of traffic used by the UPF reaches the threshold usage amount and when the UPF additionally uses 20 M after transmission of threshold usage amount information fails, the session deletion response message may include information about 20 M that has been additionally used.

In addition, the session deletion response message may include cumulative usage amount information. In another embodiment, the cumulative usage amount information may include information corresponding to a total cumulative usage amount (e.g., 400 M) obtained by adding the traffic amount (e.g., 20 M), additionally used by the UPF after retransmission failure, to the cumulative usage amount (e.g., 380 M) included in the session report message.

In operation 924, in response to identify the usage amount received from the UPF, the SMF may identify that a cumulative usage amount of the SMF is 390 M (370 M+20 M) but a total cumulative usage amount transmitted from the UPF is 400 M, and thus a lost usage amount is 10 M. Afterwards, when reporting the usage amount to the OCS, the SMF may transmit 30 M, which is the sum of the usage amount of 20 M received from UPF and the identified lost amount of 10 M.

In operation 925, the SMF may receive CCA-T from the OCS and may terminate the session.

In operation 926, the SMF may, for example, transmit a delete session response to the MME, and the MME may normally terminate the session.

Figure 10:
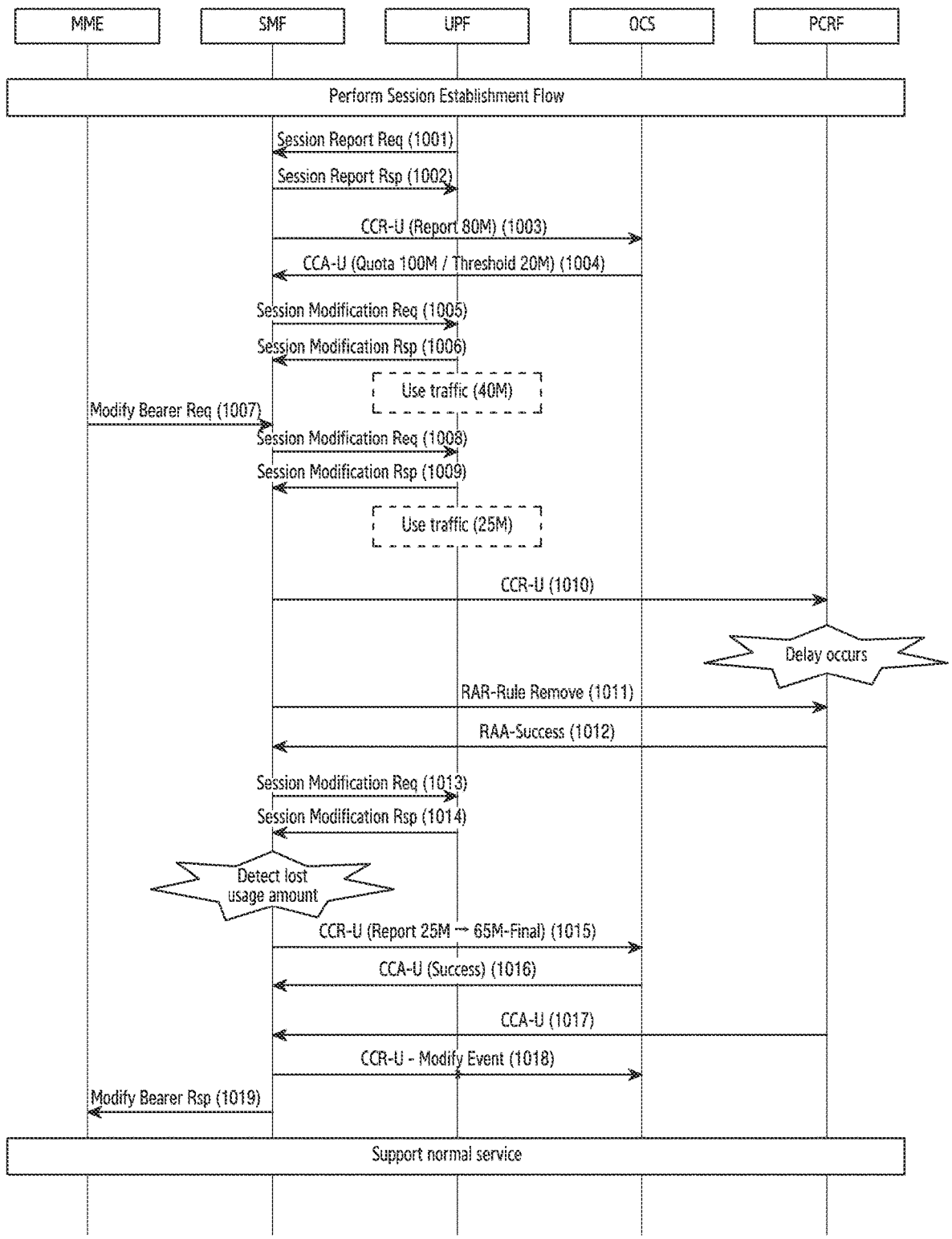
FIG. 10 illustrates a recovery operation for loss outside an Sx interface section in a wireless communication system according to an embodiment of the disclosure.

FIG. 10 illustrates a recovery operation for loss outside an Sx interface section in a wireless communication system according to an embodiment of the disclosure.

Referring to FIG. 10, a description may be made of a usage amount recovery operation through detection of a lost usage amount in the case of usage amount loss occurring due to order reversal within a system and other reasons rather than loss in the Sx/(N4) section.

In operation 1001, GWU (UPF) may transmit a session report request message to GWC (SMF). The session report request message may be transmitted when a usage amount used by the UPF corresponds to a trigger condition. The session report request message may, for example, include information such as usage amount report and trigger information, URR sequence number, URR usage amount traffic occurrence start/end time, and the like. The usage amount may be information related to traffic used by the UPF.

In addition, the session report request message may include the amount of traffic used (e.g., 80 M) and a cumulative usage amount (e.g., 300 M).

In operation 1002, the SMF may transmit a session report response message to the UPF. Additionally, the SMF may generate a message to be transmitted to an OCS, based on usage amount information included in the session report request message received from the UPF.

The SMF may add a new usage amount (80 M) to an existing cumulative usage amount (220 M), and may identify whether the summed usage amount is equal to the newly received cumulative usage amount (300 M).

In operation 1003, in response to identifying that the summed usage amount is equal to the newly received cumulative usage amount, the SMF may, for example, determine the received usage amount to be normal, and may transmit a usage amount of 80 M to the OCS.

In operation 1004, the OCS may identify the usage amount received through a CCR, may determine the remaining quota based on the identified usage amount, and may transmit event occurrence conditions and a quota available to a subscriber to the SMF. The event occurrence conditions may, for example, be information related to a threshold usage amount (a threshold).

In operation 1005, the SMF may transmit a session modification request message to the UPF. The session modification request message may include quota information and event information received from the OCS in Update URR. Additionally, the session modification request message may include information about the usage amount and the event occurrence conditions received from the OCS.

In operation 1006, the UPF may transmit a session modification response message to the SMF. The session modification response message may, for example, include information confirming that the session modification request message transmitted from the SMF has been normally received and processed.

After the UPF transmits the session modification response message to the SMF, when the amount of traffic used by the UPF reaches the threshold usage amount, a session report request may occur. The UPF may, for example, generate a session report request message to be transmitted to SMF.

In operation 1007, the SMF may receive an event from an MME. The event may be received by receiving a modify bearer request from the MME. The modify bearer request may be performed when a Modify Event or Mobility change, such as Location CHG/Serving Node CHG, occurs.

In operation 1008, after identifying a registered event trigger, the SMF may determine whether to transmit the usage amount to a charging server. When it is determined that it is necessary to transmit the usage amount to the charging server, the SMF may perform an operation of making a request to the UPF for the usage amount. In an embodiment, the operation of making a request to the UPF for the usage amount may include an operation of transmitting a session modification request message to the UPF.

In operation 1009, the UPF may transmit a session modification response message to the SMF in response to the session modification request message received from the SMF. The session modification response message may include information about the usage amount. The information about the usage amount may, for example, include information about a usage amount used up to now (40 M) and a total cumulative usage amount (340 M).

In operation 1010, when the event transmitted from the MME is an event requiring PCRF (PCF) interworking, the SMF may perform the PCRF (PCF) interworking without transmitting the usage amount to the charging.

In operation 1011, PCRF (PCF) may request to SMF through RAR to delete an existing Rule.

In operation 1012, the SMF may notify the PCRF (PCF) through the RAA that the Rule is normally deleted.

In operation 1013, the SMF may send deletion information to the UPF in order to delete Rule-related information received through the RAR, and may request a usage amount of a related Rule.

In operation 1014, the UPF may transmit a usage amount (25 M) and a cumulative usage amount (365 M) to the SMF.

In operation 1015, the SMF may detect a lost amount between the cumulative usage amount (300 M) of the SMF+the current usage amount (25 M) and the cumulative usage (365 M) received from the UPF, and may, for example, transmit information about a usage amount of 65 M rather than 25 M to OCS.

In operation 1016, the OCS may settle the received usage amount, and then transmit, to the SMF, a message indicating that the received usage amount has been normally processed.

In operation 1017, the SMF may receive a delayed CCA-U message.

In operation 1018, The operation for a delayed modify bearer request event is resumed. The used usage amount (40 M) and the cumulative amount (340 M) used by the UPF are checked, compared with the cumulative amount used in the current SMF (365 M), and it is detected that the lost amount has already been recovered, so that an additional message may not be transmitted.

In operation 1019, since the modification bearer request has been completed, a response message is transmitted to the MME. After that, the cumulative usage of SMF and UPF identically remains at 365 M, and normal service may be supported.

According to an embodiment, a method of operating a session management function (SMF) may include transmitting, based on a user plane function (UPF) and session establishment, a request message to the UPF, receiving a response message from the UPF, determining, based on the response message, whether there is a lost usage amount, and transmitting recovered usage amount information to an online charging system (OCS) in case that there is the lost usage amount, wherein the response message includes current usage amount information and cumulative usage amount information of the UPF.

The determining of whether there is the lost usage amount may include comparing a sum value of a usage amount corresponding to the current usage amount information of the UPF and a usage amount corresponding to a cumulative usage amount information stored in the SMF with the usage amount corresponding to the cumulative usage amount information.

Preferably, the recovered usage amount information may be information corresponding to a sum value of the usage amount corresponding to the current usage amount and the lost usage amount.

Preferably, the lost usage amount may be determined based on a usage amount corresponding to a difference value between the sum value and the usage amount corresponding to the cumulative usage amount information.

The request message may be a request message associated with a session established for the UPF, and the response message may be a message received in response to the request message.

According to another aspect, a session management function (SMF) device may include a transceiver and at least one processor operably connected to the transceiver, wherein the at least one processor is configured to transmit, based on a user plane function (UPF) and session establishment, a request message to the UPF, receive a response message from the UPF, determine, based on the response message, whether there is a lost usage amount, and transmit recovered usage amount information to an online charging system (OCS) in case that there is the lost usage amount, and the response message includes current usage amount information and cumulative usage amount information of the UPF.

The at least one processor may be further configured to compare a sum value of a usage amount corresponding to the current usage amount information of the UPF and a usage amount corresponding to a cumulative usage amount information stored in the SMF with the usage amount corresponding to the cumulative usage amount information in order to determine whether there is the lost usage amount.

Preferably, the recovered usage amount information may be information corresponding to a sum value of the usage amount corresponding to the current usage amount and the lost usage amount.

The lost usage amount may be determined based on a usage amount corresponding to a difference value between the sum value and the usage amount corresponding to the cumulative usage amount information.

Preferably, the request message may be a request message associated with a session established for the UPF, and the response message may be a message received in response to the request message.

According to yet another embodiment, a method of operating a user plane function (UPF) may include receiving, based on a session management function (SMF) and session establishment, a request message from the SMF, and transmitting a response message to the SMF in response to the reception of the request message, wherein the response message includes current usage amount information and cumulative usage amount information of the UPF, and the cumulative usage amount information is information corresponding to a total amount of traffic used by the UPF since the session establishment.

The request message may be a request message associated with a session established for the UPF, and the response message may be a message received in response to the request message.

According to still another aspect, a user plane function (UPF) device may include a transceiver and at least one processor, wherein the at least one processor is configured to receive, based on a session management function (SMF) and session establishment, a request message from the SMF, and transmit a response message from the SMF in response to the reception of the request message, wherein the response message includes current usage amount information and cumulative usage amount information of the UPF, and the cumulative usage amount information is information corresponding to a total amount of traffic used by the UPF since the session establishment.

The request message may be a request message associated with a session established for the UPF, and the response message may be a message received in response to the request message.

It should be appreciated that various embodiments of the disclosure and the terms used therein are not intended to limit the technological features set forth herein to particular embodiments and include various changes, equivalents, or alternatives for a corresponding embodiment. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor of terminal 120) of the machine (e.g., the electronic device 101) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to some embodiments, each element (e.g., a module or a program) of the above-described elements may include a single entity or multiple entities. According to other embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of operating a session management function (SMF), the method comprising:
    transmitting, based on a user plane function (UPF) and session establishment, a request message to the UPF;
    receiving a response message from the UPF;
    determining, based on the response message, whether there is a lost usage amount; and
    transmitting recovered usage amount information to an online charging system (OCS) in case that there is the lost usage amount,
    wherein the response message comprises current usage amount information and cumulative usage amount information of the UPF.

2. The method of claim 1, wherein the determining of whether there is the lost usage amount comprises:
    comparing a sum value of a usage amount corresponding to the current usage amount information of the UPF and a usage amount corresponding to a cumulative usage amount information stored in the SMF with the usage amount corresponding to the cumulative usage amount information.

3. The method of claim 2, wherein the recovered usage amount information is information corresponding to a sum value of the usage amount corresponding to the current usage amount information and the lost usage amount.

4. The method of claim 2, wherein the lost usage amount is determined based on a usage amount corresponding to a difference value between the sum value and the usage amount corresponding to the cumulative usage amount information.

5. The method of claim 1,
wherein the request message is a request message associated with a session established for the UPF, and
wherein the response message is a message received in response to the request message.

6. A session management function (SMF) device comprising:
a transceiver; and
at least one processor operably connected to the transceiver,
wherein the at least one processor is configured to:
transmit, based on a user plane function (UPF) and session establishment,
a request message to the UPF,
receive a response message from the UPF,
determine, based on the response message, whether there is a lost usage amount, and
transmit recovered usage amount information to an online charging system (OCS) in case that there is the lost usage amount, and
wherein the response message comprises current usage amount information and cumulative usage amount information of the UPF.

7. The device of claim 6, wherein the at least one processor is further configured to compare a sum value of a usage amount corresponding to the current usage amount information of the UPF and a usage amount corresponding to a cumulative usage amount information stored in the SMF with the usage amount corresponding to the cumulative usage amount information in order to determine whether there is the lost usage amount.

8. The device of claim 7, wherein the recovered usage amount information is information corresponding to a sum value of the usage amount corresponding to the current usage amount information and the lost usage amount.

9. The device of claim 7, wherein the lost usage amount is determined based on a usage amount corresponding to a difference value between the sum value and the usage amount corresponding to the cumulative usage amount information.

10. The device of claim 6,
wherein the request message is a request message associated with a session established for the UPF, and
wherein the response message is a message received in response to the request message.

11. A method of operating a user plane function (UPF), the method comprising:
receiving, based on a session management function (SMF) and session establishment, a request message from the SMF; and
transmitting a response message to the SMF in response to the receiving of the request message,
wherein the response message comprises current usage amount information and cumulative usage amount information of the UPF, and
wherein the cumulative usage amount information is information corresponding to a total amount of traffic used by the UPF since the session establishment.

12. The method of claim 11,
wherein the request message is a request message associated with a session established for the UPF, and
wherein the response message is a message received in response to the request message.

13. A user plane function (UPF) device comprising:
a transceiver; and
at least one processor operably connected to the transceiver,
wherein the at least one processor is configured to:
receive, based on a session management function (SMF) and session establishment, a request message from the SMF, and
transmit a response message to the SMF in response to the receiving of the request message,
wherein the response message comprises current usage amount information and cumulative usage amount information of the UPF, and
wherein the cumulative usage amount information is information corresponding to a total amount of traffic used by the UPF since the session establishment.

14. The device of claim 13,
wherein the request message is a request message associated with a session established for the UPF, and
wherein the response message is a message received in response to the request message.

\* \* \* \* \*